Patented Apr. 17, 1923.

1,452,027

UNITED STATES PATENT OFFICE.

IVAR WALFRID CEDERBERG, OF LIDINGO-BREVIK, NEAR STOCKHOLM, SWEDEN, ASSIGNOR TO NORSK HYDRO-ELEKTRISK KVAELSTOFAKTIESELSKAB, OF CHRISTIANIA, NORWAY.

CATALYZER FOR THE SYNTHETIC MANUFACTURE OF AMMONIA AND PROCESS OF PRODUCING SAME.

No Drawing.    Application filed October 20, 1920. Serial No. 418,319.

*To all whom it may concern:*

Be it known that I, IVAR WALFRID CEDERBERG, a subject of the King of Sweden, residing at Lidingo-Brevik, near Stockholm, Sweden, have invented certain new and useful Improvements in Catalyzers for the Synthetic Manufacture of Ammonia and Processes of Producing Same; and I do hereby declare the following to be a full, clear, and exact description of the invention, such as will enable others skilled in the art to which it appertains to make and use the same.

It is known from the German Patent No. 285,698 to produce ammonia synthetically by using a catalyzer produced by heating alkali or alkaline earth metal ferrocyanides or ferricyanides in an indifferent atmosphere. In the use of such a catalyzer the optimum-temperature, i. e. the temperature at which the most favorable output is obtained, is, as it is disclosed in the said patent specification, above 400° C. (for instance 420–430° C. and 130–150 atm. when ferricyanide of barium is used). This temperature limit is, however, too high, both regarding apparatuses and regarding the efficiency, because the ammonia concentration in case of equilibrium is, according to well-known principles, higher, the lower the temperature is. Thus it will be obvious that even a small decrease of the optimum-temperature is of the greatest importance as regards an economical execution of the process.

The present invention now has for its purpose to manufacture ammonia and to produce a catalyzer for such manufacture, the optimum-temperature of which is substantially lower than the temperature mentioned above —400° C.—and which on account thereof yields a far higher output of ammonia than a catalyzer produced according to German Patent 285,698 under corresponding conditions. It has been observed, namely that instead of using the double (complex) cyanides mentioned in the said patent as an initial material in the catalyzer manufacture one may use with a considerably greater advantage complex cyanides of iron and an alkali metal, in which the atomic proportion of alkali metal to iron is less than two to one.

The following examples may be given:
Triammoniumpotassiumferrocyanide

or

ferropotassiumferrocyanide (Everitt salt)

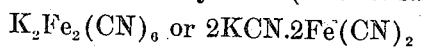

potassiumferriferrocyanide (Williamson's violet)

or

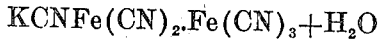

etc.

Thus it has been found for instance that Everitt salt after having been heated in nonoxidizing atmosphere, for instance in nitrogen, hydrogen or a mixture of them, to 400–500° C., results in a catalyzer which is very active even at temperatures below 400° C.

The German Patent 285,698 states as a temperature of the catalyzer manufacture 600–700° C., i. e. temperature of red heat. If this temperature is used with the substances here in question, a bad catalytic action is obtained and it has been proved that active catalyzers are obtained only on the condition that the temperature during the heating of the above mentioned cyanides is not increased above 500° C.

As the formation of ammonia, when these catalyzers are used takes place at temperatures below 400° C. and at pressure which need not increase beyond 100 atm., all difficulties as regards materials are avoided, because no chemical influence upon the apparatuses will take place. As the reaction temperature is far below incandescence, the material of the reaction vessels is not weakened, and consequently the danger of explosion is considerably decreased. The low pressure acts in the same sense. Thus it is not necessary to use complicated arrangements in order to equalize the pressure upon the walls of the reaction vessel.

I claim—

1. Process for the manufacture of ammonia which comprises heating a mixture of hydrogen and nitrogen in the presence of a catalyst, prepared by heating in a non-oxidizing atmosphere a complex cyanogen compound of iron and an alkali metal in which the atomic proportion of the alkali metal to the iron is less than two to one.

2. Process for the manufacture of ammonia which comprises heating a mixture of hydrogen and nitrogen in the presence of a catalyst, prepared by heating in a non-oxidizing atmosphere a complex cyanogen compound of iron ammonia and an alkali metal in which the atomic proportion of the alkali metal to the iron is less than two to one.

3. Process for the manufacture of ammonia which comprises heating a mixture of hydrogen and nitrogen in the presence of a catalyst, prepared by heating under pressure in a nonoxidizing atmosphere a complex cyanogen compound of iron and an alkali metal in which the atomic proportion of the alkali metal to the iron is less than two to one.

4. Process for the manufacture of ammonia which comprises heating a mixture of hydrogen and nitrogen in the presence of a catalyst, prepared by heating under pressure in a nonoxidizing atmosphere a complex cyanogen compound of iron cyanide, ammonia and an alkali metal in which the atomic proportion of the alkali metal to the iron is less than two to one.

5. Process of preparing a catalyst for the manufacture of ammonia, which comprises heating in a nonoxidizing atmosphere a complex cyanogen compound of iron and an alkali metal in which the atomic proportion of the alkali metal to the iron is less than two to one.

6. Process for preparing a catalyst for the manufacture of ammonia, which comprises heating in a nonoxidizing atmosphere a complex cyanogen compound of iron, ammonia cyanide and an alkali metal in which the atomic proportion of the alkali metal to the iron is less than two to one.

7. Process of preparing a catalyst for the manufacture of ammonia, which comprises heating under pressure in a nonoxidizing atmosphere a complex cyanogen compound of iron and an alkali metal in which the atomic proportion of the alkali metal to the iron is less than two to one.

In testimony that I claim the foregoing as my invention, I have signed my name in presence of two subscribing witnesses.

IVAR WALFRID CEDERBERG.

Witnesses:
THUN OSTERLING,
GÖRUN LINDSTRÖM.